United States Patent [19] BEST AVAILABLE COPY [11] 3,895,190
Koob et al. [45] July 15, 1975

[54] CHANNEL FILTER ARRANGEMENT FOR A CARRIER FREQUENCY TRANSMISSION SYSTEM

[75] Inventors: Ernst Koob, Deisenhofen; Wilhelm Volejnik; Helmut Matthes, both of Munich, all of Germany

[73] Assignee: Siemens Aktiengesellschaft, Berlin & Munich, Germany

[22] Filed: Mar. 22, 1973

[21] Appl. No.: 343,875

[30] Foreign Application Priority Data

Mar. 24, 1972 Germany .......... 2214583

[52] U.S. Cl. .......... 179/15 FS; 179/2.5 A
[51] Int. Cl. .......... H04j 1/08
[58] Field of Search .......... 179/15 FD, 15 FS, 2.5 A

[56] References Cited

UNITED STATES PATENTS

| | | | |
|---|---|---|---|
| 2,258,439 | 10/1941 | Bennett | 179/15 FD |
| 2,514,425 | 7/1950 | Thompson | 179/15 FD |
| 3,124,768 | 3/1964 | Tilston | 179/15 FD |

FOREIGN PATENTS OR APPLICATIONS

| | | | |
|---|---|---|---|
| 851,076 | 10/1952 | Germany | 179/15 FD |

OTHER PUBLICATIONS

*Transmission Systems for Communications;* Bell Telephone Laboratories; Copyright, 1959; pp. 5–13 to 5–17.

*Electrical Communication;* Dec., 1948; "Long Distance Telephone Communication Circuits;" by A. W. Montgomery.

*Primary Examiner*—David L. Stewart
*Attorney, Agent, or Firm*—Hill, Gross, Simpson, Van Santen, Steadman, Chiara & Simpson

[57] ABSTRACT

A carrier transmission system has a plurality of modulators for producing independent signals in individual channels, and a plurality of filters are connected to attenuate unwanted components in the outputs of the modulators. All but one of the filters are either low-pass filters or high-pass filters, and a single band-pass filter has its input connected to the outputs of the other filters and its output connected to the transmission line.

13 Claims, 3 Drawing Figures

CHANNEL FILTER ARRANGEMENT FOR A CARRIER FREQUENCY TRANSMISSION SYSTEM

BACKGROUND

1. Field of the Invention

The present invention relates to a carrier transmission system and, more particularly, to such a transmission system in which a plurality of independent signals are transmitted simultaneously over a single transmission line in a plurality of independent channels.

2. The Prior Art

Customarily, in carrier transmission systems, each of the independent signals is connected with the input of a modulator, or the like, for the purpose of modulating a carrier so that the information content of the signal is transmitted in a single channel or frequency band. Customarily, each of the modulators is connected with a band-pass filter which attenuates unwanted outputs produced by the modulator such as duplicate side bands (when only one side band is to be transmitted), and other unwanted signals such as the products of harmonic distortion, carrier leaks, etc. The unwanted outputs must be suppressed in order to avoid interfering with signals carried by other channels of the transmission system. All of the band-pass filters typically have their outputs interconnected with the transmission line, which line may take the form of a wire, a radio link, etc. In such a system, the band-pass filters must have characteristics which provide for attenuation over a wide range of frequencies, to suppress all of the spurious or unwanted signals which may interfere with other channels of the transmission system. Such band-pass filters, are typically extremely complicated and contain large numbers of reactive components.

It is desirable, if possible, to reduce the complexity of the carrier transmission system by reducing the number and complexity of the filters required for a system having a given number of information channels.

SUMMARY OF THE INVENTION

It is the principal object of the present invention to provide a carrier transmission system which employs filters having a simpler construction than heretofore.

Another object of the present invention is to provide a carrier system in which only a single band-pass filter is required for a plurality of channels of transmission in a carrier transmission system.

A further object of the present invention is to provide a carrier transmission system employing a single band-pass filter and a plurality of low-pass filters.

Another object of the present invention is to provide such a carrier transmission system in which the attenuation characteristics of the filters provided for each channel are relaxed, without interfering with transmission quality.

A further object of the present invention is to provide a carrier transmission system in which the minimum number of reactive components are employed for filters associated with such system.

These and other objects and advantages of the present invention will become manifest by an examination of the following description and the accompanying drawings.

In one embodiment of the present invention, there is provided a carrier transmission system having a plurality of modulators, a plurality of filters, and means connecting the output of each of said modulators to one of said filters, one of said filters comprising a band-pass filter, and the other such filters each comprising filters having a single cutoff frequency.

BRIEF DESCRIPTION OF THE DRAWINGS

Reference will now be made to the accompanying drawings in which:

Referring now to FIG. 1, there is illustrated a carrier transmission system incorporating five information channels. Each channel is provided with a separate modulator M1–M5, and the output of each modulator is connected to a corresponding filter F1–F5. The output of each modulator comprises signal information within a channel or frequency band defined by upper and lower frequencies, and in a typical example, the five channels to be transmitted over a transmission line extend between 312 kHz. and 552 kHz. These frequencies correspond with typical values for frequencies which are used in carrier transmission systems. The channel of the first modulator M1 lies between 312 kHz. and 360 kHz.; the channel of the modulator M2 lies between 360 kHz. and 408 kHz.; the channel of the modulator M3 lies between 408 kHz. and 456 kHz.; the channel of the modulator M4 lies between 456 kHz. and 504 kHz.; and the channel of the modulator M5 lies between 504 kHz. and 552 kHz. Each of the modulators M1–M5 produces unwanted output signals having frequencies outside the appropriate channel, which must be suppressed by the filters F1–F5.

The filters F1–F5 are connected in cascade, with the output of each filter connected to the input of the succeeding filter. Thus, the output of the filter F1 is connected to the input of the filter F2, so that the filter F2 receives two inputs, one from the filter F1 and the other from the modulator M2. Similarly, the filter F3 receives an input from the filter F2 and a second input from the modulator M3. In like manner, the filter F4 receives an input from the filter F3 and another input from the modulator M4. The filter F5 receives an input from the filter F4 and another input from the modulator M5. The output of the filter F5 is connected to the transmission line through an amplifier, modulator or the like.

The four filters F1–F4 are all low-pass filters, having a cutoff frequency near the upper edge of its respective channel. Thus, the cutoff frequency of the filter F1 is located at approximately 360 kHz., the cutoff frequency of the filter F2 is located approximately 408 kHz., and so on. The fifth filter, F5, is a bandpass filter designed to pass the entire frequency band from 312 kHz. to 552 kHz., and to suppress frequencies outside that band.

Figure 1:
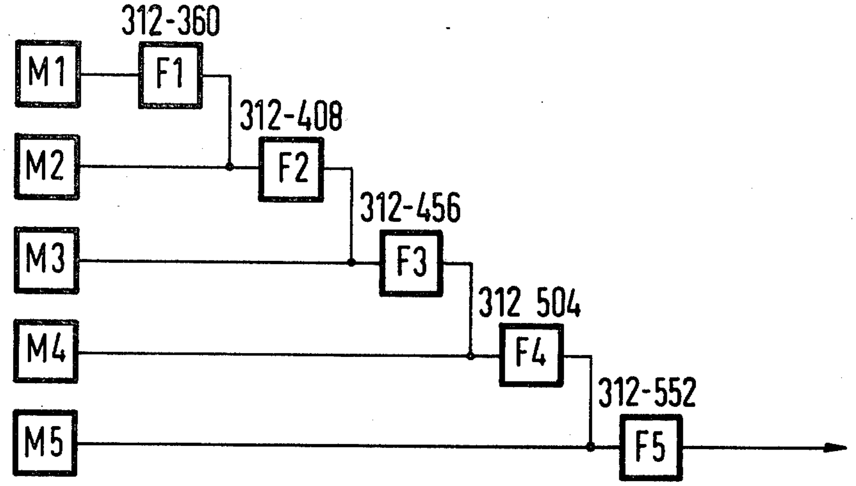
FIG. 1 is a functional block diagram of an illustrative embodiment of the present invention.

In the arrangement of FIG. 1, the frequencies which may be passed by the four filters F1–F4, extend at least from 312 kHz. upward to the upper cutoff frequency of each filter. Although the low-pass filters may also pass frequencies below 312 kHz., such frequencies are of no interest, as they are outside the passband of the band-pass filter F5.

The apparatus of FIG. 1 is eminently suited to perform as a single side band system, in which transmitted signals within each channel is composed of a single modulated side band. In such case, the frequency of the carrier for each modulator is located near the cutoff frequency of the low-pass filter, so that only the lower side band is passed by the filter. The carrier frequency, if not totally suppressed in the modulator, may be passed if it has a frequency within the frequency band of the channel, but is suppressed by the low-pass filter when the carrier frequency is above the channel's frequency band.

If it is desired to transmit the upper side band instead of the lower side band, the first four filters, F1–F4, are replaced by high-pass filters, each having a cutoff frequency near the lower frequency limit of its respective channel. The highest frequency channel is then passed by the filter F1, and lower frequency channels are passed by the filters F2–F5. The filter F5 remains a bandpass filter.

Each of the filters, F1–F4, has a minimum attenuation on one side of its cutoff frequency, and a greater attenuation on the other side of its cutoff frequency. The frequency range of the high attenuation characteristic of the filters F1–F4 is, in each case, sufficient to eliminate unwanted signal components which may adversely affect signals in other channels. However, the high attenuation need not extend throughout the entire frequency range from 312 kHz. to 552 kHz. Normally, it is sufficient for the low-pass filter F1 to maintain a high attenuation in the frequency range between 420 kHz. through 468 kHz., where significant unwanted components may be generated in the output of the modulator M1, which could interfere with signals transmitted in the third and fourth channels. The filter F1 need not have a high attenuation characteristic above 468 kHz., for frequencies in excess of that value are adequately attenuated by the succeeding low-pass filter F2, which has a high attenuation characteristic in the frequency range extending from 468 kHz. through 516 kHz. In like fashion, succeeding ones of the low-pass filters have high attenuation characteristics in higher adjacent band of frequencies, relative to those of the immediately preceding filters.

The last filter, F5, which is a band-pass filter, must have suppression characteristics extending above and below the entire pass-band of 312 kHz. to 552 kHz., so that any unwanted signals produced in the output of the filter F4 or the output of the modulator M5 are suppressed by the filter F5 before they are allowed to reach the transmission line.

Figure 2:
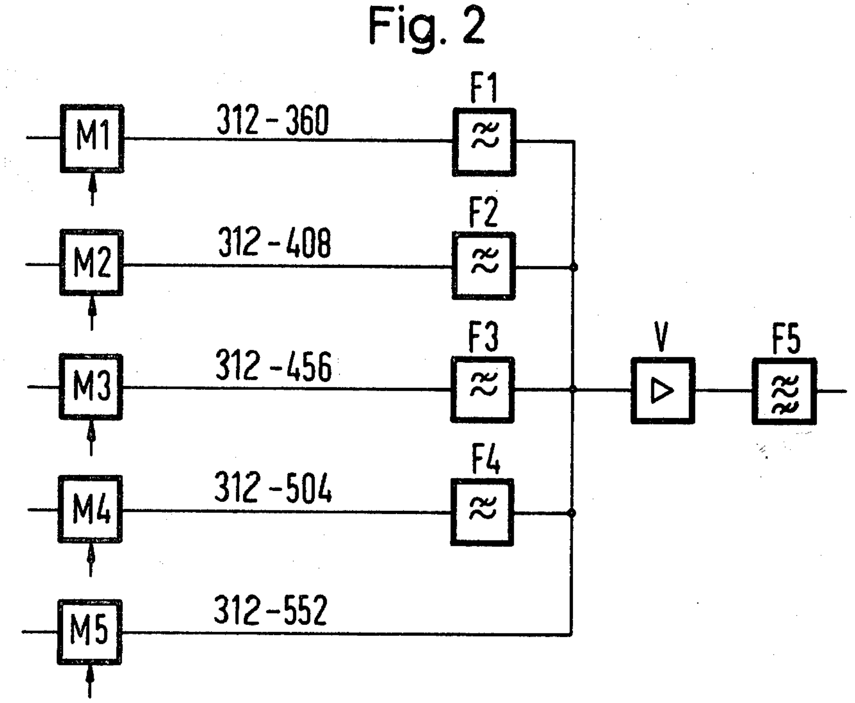
FIG. 2 is a functional block diagram of an alternative embodiment of the present invention.

An alternative arrangement of the present invention is illustrated in FIG. 2. As shown in FIG. 2, the five channels have frequencies identical to those produced in the example of FIG. 1. Each of the four modulators M1–M4 is connected directly to the input of a respective low-pass filter F1–F4, the cutoff frequencies of which are respectively near the upper edge of the pass-band, viz., 360 kHz., 408 kHz., 456 kHz., and 504 kHz. The outputs of all of the filters F1–F4, are connected in common to the input of a decoupling amplifier V, and the output of the decoupling amplifier V is connected to the input of a band-pass filter F5, the output of which is connected to the input of the transmission line. The fifth modulator M5, which produces a signal in the channel extending from 504 kHz. to 552 kHz. is connected directly to the input of the amplifier V, without a low-pass filter, but the band-pass filter F5 eliminates any spurious signals produced in the output of the modulator M5.

The arrangement of FIG. 2 provides an arrangement in which no signal must pass through more than two filters before reaching the transmission line, rather than as many as five filters in the arrangement of FIG. 1. The amplifier V functions as a decoupler for the individual filters, so the signals passed by any one filter does not influence the operation of any other filter.

Figure 3:
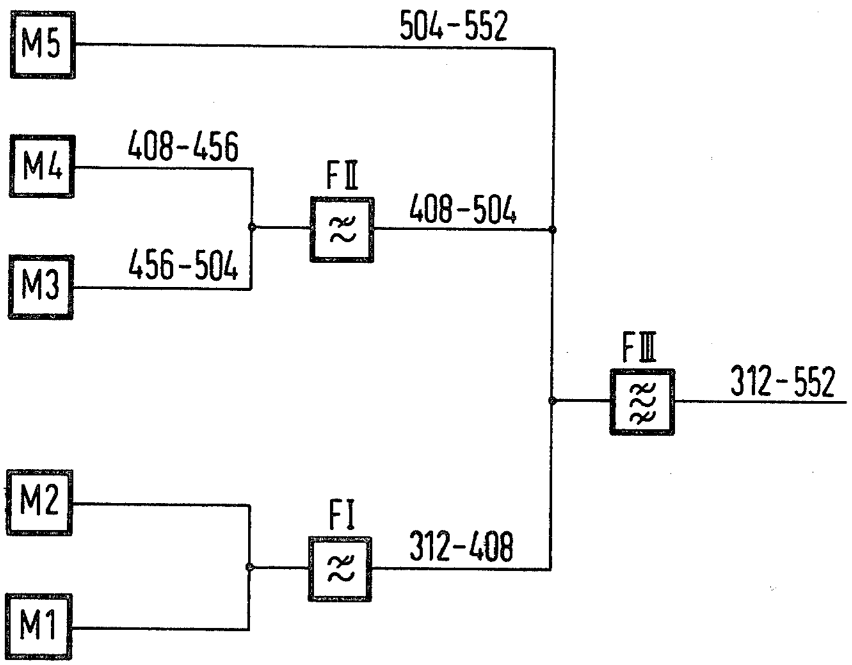
FIG. 3 is a functional block diagram of yet another embodiment of the present invention.

Another arrangement as illustrated in FIG. 3, where not only is the construction of the various filters simplified, but also their total number is reduced. The arrangement of FIG. 3 requires only three filters designated respectively, as F1, FII and FIII. In the arrangement of FIG. 3, the two modulators M1 and M2 comprise a sub-group, and are each connected to the input of the filter F1. The channel frequencies of the modulators of FIG. 3 are the same as described in connection with the correspondingly identified modulators of FIGS. 1 and 2. The filter F1 is a low-pass filter having its cutoff frequency at approximately 408 kHz., so that the frequencies of the lower two channels, produced by modulators M1 and M2, are both passed by the filter FI. In similar fashion, signals in the third and fourth channels, generated by the modulators M3 and M4 which extend from 408 kHz. to 504 kHz., are connected to the input of a low-pass filter FII, having its cutoff frequency at approximately 504 kHz. The outputs of the two low-pass filters FI and FII, are connected to the input of a band-pass filter FIII, which is a filter which performs the function of the band-pass filter F5 in the systems of FIGS. 1 and 2. The output of the modulator M5 is connected directly to the input of the band-pass filter FIII, in the same manner as in the apparatus of FIG. 2. It will be appreciated that the arrangement of FIG. 3 functions in the same manner as that of FIG. 2, except that a lesser number of low-pass filters is required, provided that adjacent channels do not produce spurious signals which interfere with each other. Normally, the spurious signals produced by any of the modulators M1–M4, do not interfere with the adjacent channels, but only with channels which are further removed in frequency. Accordingly, the combination of the signals of channels 1 and 2 and channels 3 and 4 together, before being passed through the low-pass filters FI and FII, do not introduce any unwanted signals in the output, but the number of filters required is vastly reduced.

The arrangement described in FIGS. 1–3, which employ a number of low-pass filters and only one band-pass filter in each case, can be constructed in a much more economical manner than carrier transmission systems of the prior art. Typically, in order to prevent spurious signals from reaching the transmission line, the band-pass filter required at the output of each of the five modulators a five-channel system requires only five inductors and eleven capacitors, and accordingly, represents an extremely complex structure. In contrast to this, the various filters employed in the systems of FIGS. 1–3 require a far less number of inductances and capacitances, as illustrated in the following table:

| | FIG. 1 | | FIG. 2 | | FIG. 3 | |
|---|---|---|---|---|---|---|
| | L | C | L | C | L | C |
| F1 | 2 | 5 | 3 | 8 | | |
| F2 | 2 | 5 | 3 | 8 | | |

-Continued

| | FIG. 1 L | FIG. 1 C | FIG. 2 L | FIG. 2 C | FIG. 3 L | FIG. 3 C |
|---|---|---|---|---|---|---|
| F3 | 2 | 5 | 3 | 6 | | |
| F4 | 2 | 5 | 2 | 6 | | |
| F5 | 5 | 10 | 5 | 10 | | |
| FI | | | | | 4 | 9 |
| FII | | | | | 4 | 9 |
| FIII | | | | | 4 | 8 |
| Total | 13 | 30 | 16 | 38 | 12 | 26 |

As illustrated in the foregoing table, a total of 13 inductors and 30 capacitors are required in the arrangement of FIG. 1; FIG. 2 requires 16 inductors and 38 capacitors; and FIG. 3 requires 12 inductors and 26 capacitors. In each case, the number of components is vastly less than the 25 inductors and 55 capacitors required in prior art systems. The specific constructions of the filters employed in the systems illustrated in FIGS. 1–3, are not described in detail as they are well-known to those skilled in the art.

Although the present invention has been specifically described in terms of a system employing low-pass filters and a band-pass filter, in each embodiment, the low-pass filters may optionally be replaced with high-pass filters, the cutoff frequency of the high-pass filters being located near the lower frequency limit of its respective band.

We claim:

1. In an n channel carrier transmission system having a plurality of channels for transmitting signals, and a plurality of $n$ modulators for producing signals to be simultaneously transmitted in said channels, means for connecting said modulators to a transmission line, comprising a filter network interconnected between said modulators and said transmission line, said filter network comprising a low-pass filter, means connecting one of said modulators to said low-pass filter, a single band-pass filter, means for connecting the output of another of said modulators directly to said band-pass filter, means for connecting the output of said low-pass filter to said band-pass filter, and means for connecting the output of said band-pass filter to said transmission line, wherein the number of low-pass filters does not exceed $n-1$.

2. Apparatus according to claim 1, wherein said filter network includes a plurality of low-pass filters, and means connecting all but one of said modulators to individual ones of said low-pass filters, and means for connecting the outputs of all of said low-pass filters to the input of said band-pass filter.

3. Apparatus according to claim 2, wherein said low-pass filters are connected in cascade, with the output of each low-pass filter connected to the input of the filter which is connected with the modulator for the channel having the next higher frequency band.

4. Apparatus according to claim 2, wherein the output of said low-pass filters are all connected in common to the input of said band-pass filter.

5. Apparatus according to claim 4, including decoupling means interconnected between said low-pass filters and said band-pass filter.

6. Apparatus according to claim 2, wherein the cutoff frequencies of said low-pass filters are positioned near the upper boundary frequencies of their respective channels.

7. Apparatus according to claim 1, wherein said filter network comprises means for connecting a plurality of adjacent channels to the input of a single low-pass filter.

8. In an n channel carrier transmission system having a plurality of channels for transmitting signals, and a plurality of $n$ modulators for producing signals to be simultaneously transmitted in said channels, means for connecting said modulators to a transmission line, comprising a filter network interconnected between said modulators and said transmission line, said filter network comprising a high-pass filter, means connecting one of said modulators to said high-pass filter, a single band-pass filter, means connecting the output of said high-pass filter to said band-pass filter, means for connecting the output of another of said modulators directly to said band-pass filter, and means for connecting the output of said band-pass filter to said transmission line, wherein the number of high-pass filters does not exceed $n-1$.

9. A carrier frequency transmission system having $n$ channels for transmitting signals, a plurality of $n$ modulators for producing signals to be simultaneously transmitted in said channels, and a filter network interconnected between said modulators and transmission line comprising a plurality of filters each having an attenuation band, said filters having partially overlapping attenuation bands, each filter of said filter network being connected to a modulator for each channel to be transmitted, the last of said filters being a band-pass filter having two spaced cutoff frequencies, means for connecting said band-pass filter directly to one of said modulators, and all other filters being composed of simple filters having a single cutoff frequency, the number of said other filters not exceeding $n-1$, each of said other filters being effective to cooperate with one of the cutoff frequencies of said band-pass filter to limit the passband of frequencies supplied to the transmission line by its modulator.

10. Apparatus according to claim 9, wherein said band-pass filter has a band-pass embracing all of said channels, and wherein the band width of signals passed by each of said simple filters is increased, by an amount equal to the band width of a single channel, from the band width of signals passed by the preceding simple filter.

11. Apparatus according to claim 9, wherein said band-pass filter is connected to receive the outputs of all of said simple filters and the output of its respective modulator.

12. Apparatus according to claim 9, including means for combining, into a subgroup, a plurality of modulators whose carrier frequencies do not fall within the passbands provided for single side bands of said modulators, means for connecting the outputs of said subgroup of modulators to the input of a single simple filter having a single cutoff frequency, and a band-pass filter connected to the output of said simple filters and to the output of a further modulator.

13. Apparatus according to claim 9, including a decoupling amplifier coupled in the input of said band-pass filter.

* * * * *